(12) United States Patent
France

(10) Patent No.: US 8,908,155 B2
(45) Date of Patent: Dec. 9, 2014

(54) REMOTE POSITIONING

(75) Inventor: Peter France, Westmorland (NZ)

(73) Assignee: Trimble Navigation Limited, Westminster, CO (US)

( * ) Notice: Subject to any disclaimer, the term of this patent is extended or adjusted under 35 U.S.C. 154(b) by 371 days.

(21) Appl. No.: 13/355,380

(22) Filed: Jan. 20, 2012

(65) Prior Publication Data

US 2012/0188529 A1 Jul. 26, 2012

Related U.S. Application Data

(60) Provisional application No. 61/435,189, filed on Jan. 21, 2011.

(51) Int. Cl.
*G01C 3/08* (2006.01)
*G01C 3/10* (2006.01)

(52) U.S. Cl.
CPC ........................ *G01C 3/10* (2013.01)
USPC ......... 356/3.13; 356/3.01; 356/4.01; 356/4.1; 356/5.01

(58) Field of Classification Search
CPC ............. G01C 3/08; G01C 1/04; G01C 1/02; G01C 3/20; G01C 3/30; G01C 5/00
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 5,903,235 A | 5/1999 | Nichols | |
| 5,977,908 A | 11/1999 | Nichols | |
| 6,052,083 A | 4/2000 | Wilson | |
| 6,067,046 A | 5/2000 | Nichols | |
| 6,980,812 B1 | 12/2005 | Sandhu et al. | |
| 7,409,312 B2 | 8/2008 | Conner et al. | |
| 2005/0057745 A1* | 3/2005 | Bontje | 356/139.03 |
| 2007/0008515 A1 | 1/2007 | Otani et al. | |
| 2007/0288197 A1 | 12/2007 | Martin | |

OTHER PUBLICATIONS

Smart Measure—Androit Apps on Google Play, retrieved on May 29, 2012 from the internet <URL: https://market.android.com/details?id=kr.sira.measure&feature=search_result 2 pages.
Android boy's Lab: Smart Measure Lite (ver 1.4) manual, dated Oct. 6, 2010, retrieved on May 30, 2012 from the internet <URL: http://androidboy1.blogspot.com/2010/10/smart-measure-ver-10-manual.html 3 pages.

\* cited by examiner

*Primary Examiner* — Luke Ratcliffe
(74) *Attorney, Agent, or Firm* — Kilpatrick Townsend & Stockton LLP

(57) ABSTRACT

A method for determining a distance to a target point located approximately at ground level includes aiming a measurement device at the target point, determining a tilt of the measurement device using tilt sensors, and determining a height of the measurement device above the ground. A position of the target point may be determined using the tilt and height of the measurement device, a position of the measurement device, and a bearing to the target point.

16 Claims, 5 Drawing Sheets

REMOTE POSITIONING

CROSS-REFERENCES TO RELATED APPLICATIONS

The present application claims benefit of priority under 35 U.S.C. §119(e) of U.S. Provisional Application No. 61/435,189, filed Jan. 21, 2011, the content of which is incorporated herein by reference in its entirety for all purposes.

FIELD OF INVENTION

The present invention relates generally to remote positioning. More particularly, the present invention relates to determining distances to objects and locations of objects.

BACKGROUND

Mapping and geospatial information system (GIS) field workers need to collect positions of assets. A global navigation satellite system (GNSS) such as a global positioning system (GPS) is the tool of choice, but sometimes remote positioning is desired. For example, GPS may not be accurate enough near tall buildings or under trees or overhangs, or the field workers may want to avoid having to physically visit assets in the middle of a road or across a stream.

A simple and efficient workflow is desired where only sub-meter or better accuracy is required (that is, centimeter or millimeter accuracy is not required). Many common scenarios only require a short range of 2-15 meters. For example, if the feature is under a tree or overhang, a good sky-view can usually be obtained only a few meters away. Similarly, a feature may often be inaccessible or inconveniently located, or there may be multiple features within the view of a single location. In each of these instances, it may be difficult or inefficient to physically visit the location of each feature.

Laser rangefinders are commonly used to measure distance. Laser rangefinders are relatively difficult to aim, however, as they often have high-power optical sights. Also, sometimes it is difficult to tell if you are measuring the distance to a target point or the distance to an object that is behind or in front of the target point. Other drawbacks are that the laser rangefinders have to be charged, carried and used, with the attendant bulk, weight, cost, and power consumption.

Other techniques (e.g., bearing-bearing intersection) do not require a laser, but they do require a two-shot workflow. This also requires the operator to move between two different locations to measure a single location and complicates the required calculations. By requiring two locations, the measurements may be difficult to repeat and verify.

Total stations are also sometimes used. While more accurate, the cost, time, and complexity are unattractive.

Thus, there is a general need in the art for a simple, single-shot measurement device and method that is cost effective and convenient for the user.

SUMMARY

Embodiments of the present invention provide distance and location measurements with reasonable accuracy over short ranges as long as the target point is near ground level and the ground between the operator and the target point is substantially flat (or the target point is at approximately the same elevation as the operator). Embodiments of the present invention can provide sub-meter accuracy when measuring distances of up to 7 meters and sub-2 meter accuracy when measuring distances of between 7-15 meters.

In an embodiment, an operator has a GPS handheld device with an aiming device (e.g., an integrated camera), a magnetic compass, and one or more tilt sensors.

In another embodiment, only one shot is required for distance and location measurements and a user interface of the measurement device may be simple and intuitive—e.g., "Location by pointing."

In accordance with another embodiment of the invention, a method for determining a distance to a target point located approximately at ground level includes aiming a measurement device at the target point and determining a tilt of the measurement device using one or more tilt sensors. The method also includes computing the distance to the target point using the tilt of the measurement device and a height of the measurement device.

In an embodiment, the distance is computed using the equation $$d = \frac{h}{\tan\theta}.$$

In another embodiment, aiming the measurement device comprises locating the target point in an image on a screen of the measurement device. In another embodiment, aiming the measurement device comprises aligning a portion of a real-time video display of the measurement device with the target point.

In yet another embodiment, the method also includes inputting the height of the measurement device.

In accordance with another embodiment of the invention, a method for determining a position of a target point located approximately at ground level includes aiming a measurement device at the target point, determining a tilt of the measurement device using one or more tilt sensors, determining a position of the measurement device, determining a bearing of the measurement device, and computing a distance to the target point using the tilt of the measurement device and a height of the measurement device. The method also includes computing the position of the target point using the position of the measurement device, the bearing of the measurement device, and the distance to the point.

In one embodiment, the position is determined using a global positioning system (GPS). In another embodiment, determining the position of the measurement device comprises using a global navigation satellite system (GNSS).

In another embodiment, the bearing is determined using an electronic compass.

In accordance with another embodiment of the invention, an apparatus for determining a distance to a target point located approximately at ground level includes an aiming device configured to align the apparatus with the target point, one or more tilt sensors configured to determine a tilt of the apparatus while aligned with the target point, and a first computing module configured to compute a distance to the target point using the tilt of the apparatus and a height of the apparatus. In some embodiments, the apparatus may be configured to determine a position of the target point and may include a position measurement device configured to determine a position of the apparatus, a bearing measurement device configured to determine a bearing of the apparatus, and a second computing module configured to determine the position of the target point using the position of the apparatus, the bearing of the apparatus, and the distance to the target point.

In an embodiment, the aiming module comprises a camera.

In accordance with yet another embodiment of the invention, a method of determining a width of an object includes determining a location of a first point at approximately ground level on a first side of the object. Determining the location of the first point may include aiming a measurement device at the first point, determining a tilt of the measurement device while aimed at the first point, determining a bearing of the measurement device while aimed at the first point, and computing a distance to the first point using the tilt of the measurement device while aimed at the first point and a height of the measurement device. The method also includes determining a location of a second point at approximately ground level on a second side of the object. Determining the location of the second point may include aiming the measurement device at the second point, determining a tilt of the measurement device while aimed at the second point, determining a bearing of the measurement device while aimed at the second point, computing a distance to the second point using the tilt of the measurement device while aimed at the second point and a height of the measurement device. The method also includes computing a distance between the first point and the second point using the distance to the first point, the distance to the second point, the bearing of the measurement device while aimed at the first point, and the bearing of the measurement device while aimed at the second point.

In an embodiment, the first position of the measurement device is different than the second position of the measurement device, and computing the distance between the first point and the second point also uses the location of the first position and the location of the second position.

DETAILED DESCRIPTION

Figure 1:
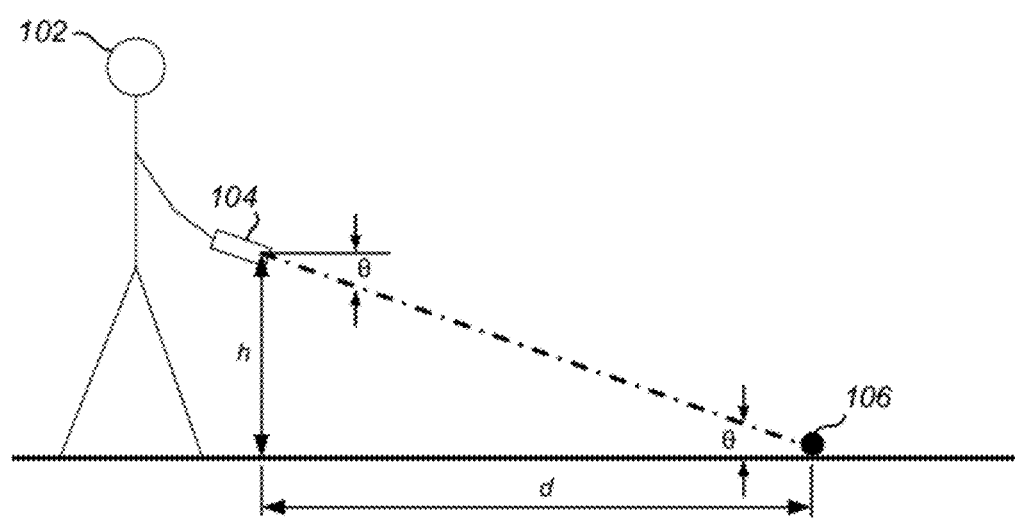
FIG. 1 is a simplified diagram illustrating a method for determining a location of a point in accordance with an embodiment of the present invention.

FIG. 1 is a simplified diagram illustrating a method for determining a location of a point in accordance with an embodiment of the present invention. An operator 102 determines a distance d to a ground level point 106 using a measurement device 104. The distance d is determined by pointing the measurement device 104 at the point 106 using an aiming device and determining a tilt of the measurement device 104 using one or more tilt sensors. The measurement device 104 is held at a known height h above the ground, and the distance d is computed using the equation:

$$d = \frac{h}{\tan\theta} \quad (1)$$

The measurement device 104 may also be used to determine a position of the point 106. In this embodiment, a position measurement device (e.g., GNSS or GPS) may be used to determine a position of the measurement device 104, and a bearing measurement device (e.g., electronic compass) may be used to determine a bearing of the measurement device 104. The position measurement device and the bearing measurement device may be integrated with the measurement device 104. Alternatively, the position measurement device may be may be a separate device, such as a handheld GPS receiver. Measurements from a single integrated device or from one or more separate devices can be combined to determine the position of the point 106. The position of the point 106 may be determined using the position of the measurement device 104, the bearing of the bearing measurement device, and the distance determined using the measurement device 104.

A workflow in accordance with an embodiment of the invention may be relatively simple. A user interface may include a visual display of a portion of a user's field of view. A "location by pointing" or similar function in the user interface of the measurement device 104 may be selected. In some embodiments, a live camera view may be shown on a digital screen of the measurement device 104. Other embodiments may use a viewfinder window, while yet other embodiments may include a digital output configured to transmit a visual signal to the screen of a PDA, laptop computer, or any other electronic device that includes a visual display.

The device may receive an input identifying the target point. A distance to the remote point or a location of the remote point may be calculated using equation (1). An error estimate may also be calculated in some embodiments.

Figure 2:
FIG. 2 is a simplified diagram showing a graphic icon overlaid on a live camera view at a calculated position in accordance with an embodiment of the present invention.

The user interface may show the newly calculated position as a graphic icon overlaid on the live camera view as shown in FIG. 2. This enables instant intuitive feedback, especially if the measurement device 104 is moved a few meters to the side and checked that the calculated position lines up with the real object.

If the accuracy of the measurement is not sufficient, the results may be fine-tuned by taking a new measurement from a position a few meters to the side. This supplies the data required to calculate a bearing-bearing intersection, giving a more accurate position. Alternatively, improving accuracy could be as easy as dragging the graphic icon to the correct location on the screen and updating the distance and/or location of the point accordingly.

Alternative Workflows for Target Selection

In some situations it may not be easy to select a target on the screen while a live camera view is shown, especially if the target is moving, an operator's hands are not steady, or the target is not close. To improve ease of use, some embodiments may provide crosshairs near a center of the live camera view. The operator may press a button on the measurement device 104 when the target is in the crosshairs.

Some embodiments may provide a button to freeze the camera view and record sensor measurements. This allows the target to be selected more easily as it is not moving around the screen.

Digital zoom can optionally be used with any of the above embodiments to increase targeting precision. Using a zoom may make it more difficult to aim the measurement device while in live camera mode, however, and may work best with the freeze mode.

In some embodiments, the aiming device may emit a laser beam for aiming the measurement device at the target.

Accuracy of distance and/or location measurements generally depend on (1) how close the target point is to ground level; (2) how flat the ground is between the operator and the target; and (3) how accurately the height of the device is known.

Fortunately, these conditions are met in a large proportion of possible scenarios. Height at ground level is usually the elevation of common features such as bottoms of trees, poles, buildings, hydrants etc. Also, the ground is flat in many locations, especially over short ranges (10 meters or so). Even in hilly areas, it is quite possible to measure across a slope (rather than up or down the slope). A user may set antenna height, even for handheld devices. Experiments have shown that handheld device height is not varied by more than ±4 centimeters in normal use.

With the assumption that the target lies on a substantially planar surface near ground level, target pixel identification plus GPS and tilt sensors can be used to describe a ray from the camera to the target. The remote position of the target is simply the intersection of the ray and the ground surface as shown in FIG. 1.

Widths and heights can also be calculated in accordance with embodiments of the invention. A target location can first be calculated as explained above. Then the device can be aimed at other points to calculate a width or height of the original object. The assumption is that the width or height is in the same plane as the focal plane.

In an embodiment, a distance between two remote points near ground level is determined (e.g., points at opposite sides of an object such as a building). A location of a first point is determined. The measurement device is then pointed at a second point and a location of the second point is determined. A distance between the points can be calculated based on the measured locations. The location measurements can be taken from the same or different positions. For example, an operator may move to a different position before determining the location of the second point. Position measurements may be obtained at each measurement position (e.g., using a GPS) and used in the distance calculation.

Benefits from using embodiments of the present invention include:
   Simple intuitive operation.
   No laser required.
   Less weight and easier aiming than laser rangefinders.
   Higher accuracy available when using a second measurement from a different position.

Sources of error using embodiments of the present invention include:
   Magnetic compass error;
   Tilt sensor error;
   GPS measurement error;
   Variation in elevation;
   Variation in device height; and
   Camera lens distortion.

The following error analysis assumes that the measurement device 104 uses low-cost commercially available sensors.

Figure 3:
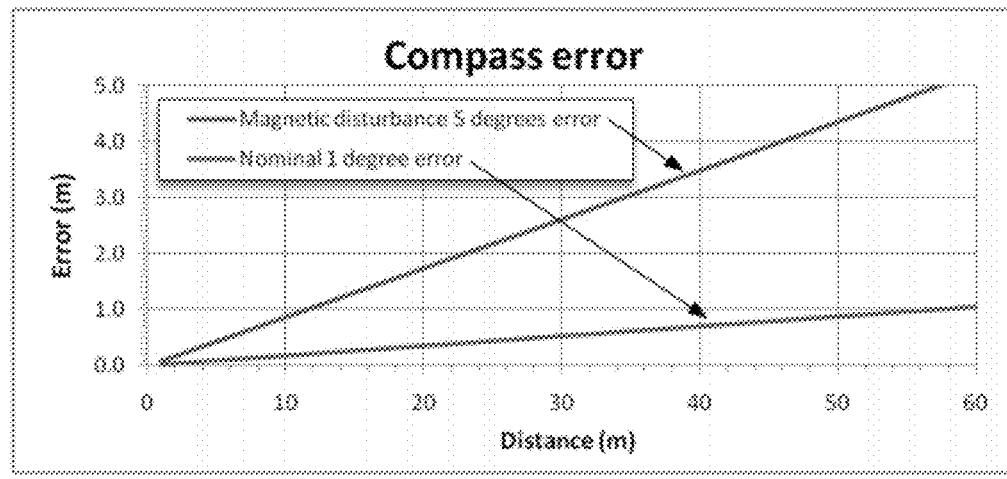
FIGS. 3-6 are plots showing impact of various errors on calculated distance measured in accordance with embodiments of the present invention.

Magnetic compass error may nominally be about 1 degree in standard conditions, but could be up to tens of degrees near severe magnetic disturbances. A five degree upper limit is a reasonable assumption under normal working conditions. The effect of compass error vs. distance to the target is plotted in FIG. 3. Note that compass error also affects conventional methods, such as laser-plus-compass and bearing-bearing intersection techniques.

Figure 4:
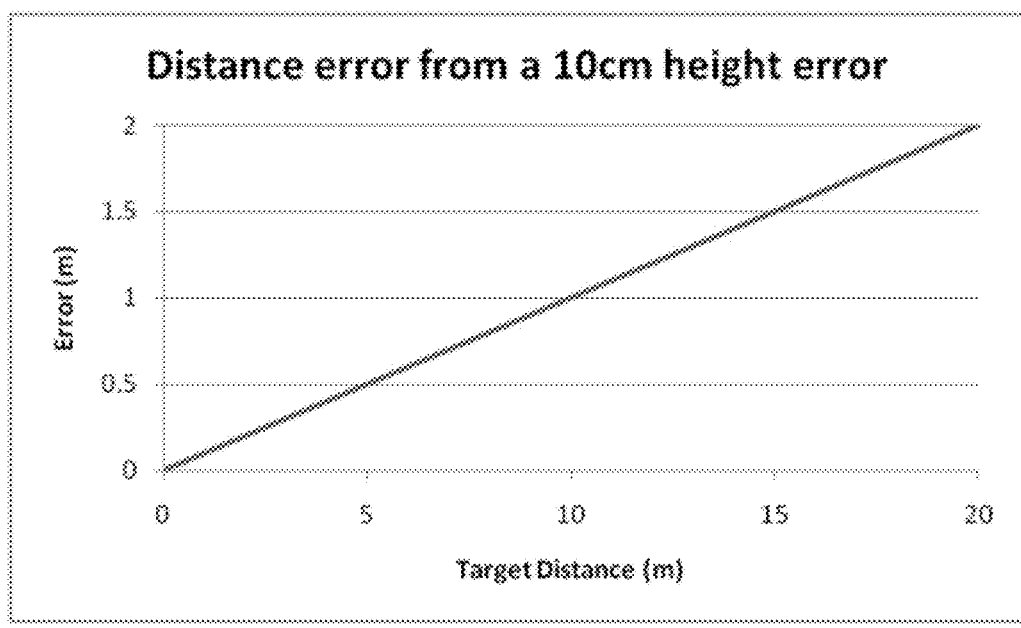

If the target is not at ground level then some error will result. The magnitude of this error is proportional to the distance to the target as shown in FIG. 4.

It can be assumed that the operator has entered a correct antenna height. Application software can be configured to issue a warning if the value is outside an expected range. Experiments have shown that operators typically hold a handheld device within ±4 centimeters from a nominal. The resultant effect on position error is also proportional to the distance to the target as shown in FIG. 4.

Figure 5:
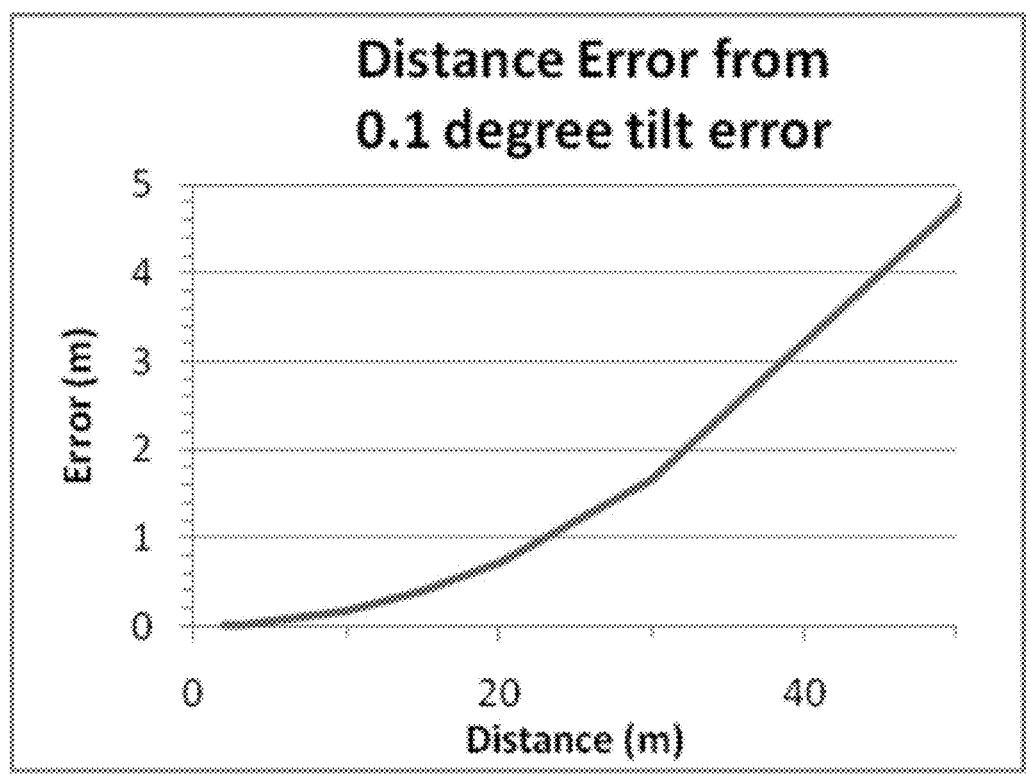

Tilt error is typically small, generally about 0.1 degree. The effect of tilt error increases with distance to the target and as the target nears the horizon. This is shown in FIG. 5.

With conventional GPS devices, location error is typically <10 centimeters in open environments. Even when using a GPS that has only sub-meter accuracy, the accuracy is generally better than 50 centimeters in normal conditions. Note that the GPS error is the same for other remote-positioning methods such as laser range finding and bearing-bearing intersection techniques.

Lens distortion can introduce error when the target is not in the center of the image. This error can be compensated by using a lens distortion calibration, either for the model of the lens used or for the specific lens in each device. Most operators are likely to aim the camera so that the target is in the center of the image so that it can reasonably be assumed that this is a minimal effect.

Human error is not accounted for in this analysis, on the grounds that a digital zoom can be used to precisely select the target pixel and aiming errors are generally minimal compared to other errors. Similarly, it is assumed that the camera, compass, and tilt sensors are calibrated so that misalignment between them is minimized.

Figure 6:
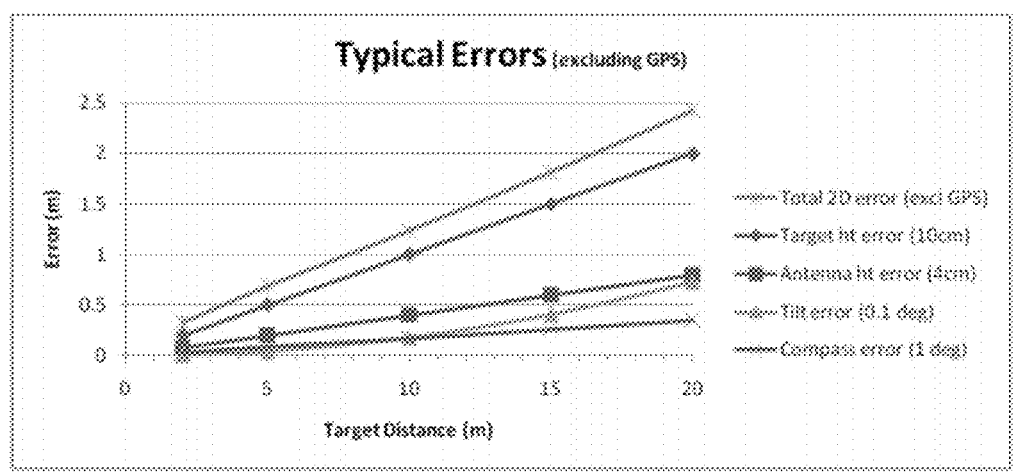

The combination of these error sources is shown in FIG. 6 using typical values. GPS error is not included in this example. The total horizontal error is typically sub-meter at distances out to 7 meters and less than 2 meters at distances between 7-15 meters.

If a first distance measurement or location is not accurate enough for a particular application, the application software can offer options to improve the position. There are several possibilities, including:
   Move a few meters to the side and take another measurement. A bearing-bearing calculation may be performed, removing the assumptions about flat ground and correct antenna height. This can improve accuracy particularly over longer ranges.
   Guide an operator to walk to the target point and press a button to capture a barometer reading. The barometer differential gives a height change. This improves horizontal and vertical accuracy for scenarios where the ground is not flat.

Hardware constraints require that the camera focal point and GPS antenna phase center are physically separated. This can be modeled to improve accuracy depending on the particular application.

The tilt and bearing sensors generally require calibration. The camera may also require calibration so that a misalignment value can be applied if necessary (because the center of the image is not likely to be at zero pitch and north). The camera and lens can also influence accuracy. More expensive metric cameras can be used to improve accuracy, but it may be feasible to achieve sufficient accuracy useful for mapping and GIS workers using inexpensive consumer camera modules. A lens distortion measurement may be performed for a sample of production camera modules, and the resultant model may be used to apply a software correction. This assumes that there is not a large variation in lenses from camera to camera.

If GPS post-processing is necessary, then some information may be stored in order to repeat the remote positioning measurement. This information consists of the yaw, pitch, roll, and target pixel coordinates, in addition to the position and bearing measurements. The calibration data may also be required.

It should be appreciated that some embodiments of the present invention may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description but should be determined with reference to the appended claims along with their full scope of equivalents.

What is claimed is:

1. A method for determining a horizontal distance between a first location and a target point located approximately at ground level, the method comprising:
   at the first location:
      aiming the handheld measurement device at the target point; and
      determining a tilt of the handheld measurement device while aiming the handheld measurement device at the target point, the tilt determined using one or more tilt sensors; thereafter
   computing the horizontal distance between the first location and the target point using the tilt of the handheld measurement device and a fixed height of the handheld measurement device above the ground, wherein the horizontal distance between the first location and the target point is computed without measuring a distance between the handheld measurement device and the target point and without measuring a height of the handheld measurement device at the first location.

2. The method of claim 1 wherein the horizontal distance between the first location and the target point is computed using the equation $$d = \frac{h}{\tan\theta}.$$

3. The method of claim 1 wherein aiming the handheld measurement device comprises locating the target point in an image on a screen of the handheld measurement device.

4. The method of claim 1 wherein aiming the handheld measurement device comprises aligning a portion of a real-time video display of the handheld measurement device with the target point.

5. The method of claim 1 further comprising inputting the fixed height of the handheld measurement device above the ground.

6. A method for determining a position of a target point located approximately at ground level, the method comprising:
   at a first location:
      aiming a handheld measurement device at the target point;
      determining a tilt of the handheld measurement device while aiming the handheld measurement device at the target point, the tilt determined using one or more tilt sensors;
      determining a position of the handheld measurement device; and
      determining a bearing of the handheld measurement device;
   computing a horizontal distance between the first location and the target point using the tilt of the handheld measurement device and a fixed height of the handheld measurement device above the ground; and
   computing the position of the target point using the position of the handheld measurement device, the bearing of the handheld measurement device, and the horizontal distance between the first location and the target point, wherein the horizontal distance between the first location and the target point is computed without measuring a distance between the handheld measurement device and the target point and without measuring a height of the handheld measurement device at the first location.

7. The method of claim 6 wherein the horizontal distance between the first location and the target point is computed using the equation $$d = \frac{h}{\tan\theta}.$$

8. The method of claim 6 wherein the position is determined using a global positioning system (GPS).

9. The method of claim 6 wherein determining the position of the handheld measurement device comprises using a global navigation satellite system (GNSS).

10. The method of claim 6 wherein the bearing is determined using an electronic compass.

11. A handheld apparatus for determining a horizontal distance between a first location and a target point located approximately at ground level, comprising:
   an aiming device configured to align the handheld apparatus with the target point;
   one or more tilt sensors configured to determine a tilt of the handheld apparatus while aligned with the target point; and
   a first computing module configured to compute a horizontal distance between the first location and the target point using the tilt of the handheld apparatus and a fixed height of the handheld apparatus above the ground, wherein the horizontal distance between the first location and the target point is computed without using a measured distance between the handheld apparatus and the target point and without using a measured height of the handheld apparatus at the first location.

12. The handheld apparatus of claim 11 wherein the handheld apparatus is further configured to determine a position of the target point, the handheld apparatus further comprising:
   a position measurement device configured to determine a position of the handheld apparatus;
   a bearing measurement device configured to determine a bearing of the handheld apparatus; and a second computing module configured to determine the position of the target point using the position of the handheld apparatus, the bearing of the handheld apparatus, and the horizontal distance between the first location and the target point.

13. The handheld apparatus of claim 11 wherein the aiming module comprises a camera.

14. The handheld apparatus of claim 11 wherein the position measurement device comprises a global navigation satellite system (GNSS).

15. The handheld apparatus of claim 11 wherein the bearing measurement device comprises an electronic compass.

16. The handheld apparatus of claim 11 wherein first computing device uses the equation $$d = \frac{h}{\tan\theta}$$

to compute the horizontal distance between the first location and the target point.

* * * * *